United States Patent [19]

Carton-Bacon

[11] Patent Number: 4,880,407
[45] Date of Patent: Nov. 14, 1989

[54] CONE CLUTCH

[75] Inventor: Philip H. Carton-Bacon, New Haven, Conn.

[73] Assignee: Custom Products Corporation, New Haven, Conn.

[21] Appl. No.: 156,245

[22] Filed: Feb. 16, 1988

[51] Int. Cl.⁴ .............................................. F16D 7/02
[52] U.S. Cl. ........................................ 464/43; 464/44
[58] Field of Search ........................ 464/30, 42, 43, 44

[56] References Cited

U.S. PATENT DOCUMENTS

| 991,630 | 5/1911 | Miller | 464/42 X |
|---|---|---|---|
| 1,002,310 | 9/1911 | Procunier | 464/44 X |
| 1,198,421 | 9/1916 | Conklin | 464/44 |
| 1,416,283 | 5/1922 | Gmeinder . | |
| 1,550,936 | 8/1925 | Veith | 464/42 X |
| 1,598,839 | 7/1926 | Wills . | |
| 1,808,700 | 6/1931 | Wendell . | |
| 1,833,681 | 11/1931 | Leinbach . | |
| 2,175,382 | 10/1939 | Eason . | |
| 2,744,597 | 5/1956 | Merrit . | |
| 2,974,503 | 3/1961 | Newton | 464/44 |
| 3,726,109 | 4/1973 | Mortensen | 464/42 |
| 3,741,527 | 6/1973 | Dahl | 464/43 X |
| 3,822,768 | 9/1974 | Sebulke . | |
| 3,866,726 | 2/1975 | Arenz . | |

FOREIGN PATENT DOCUMENTS 2414135 10/1975 Fed. Rep. of Germany ........ 464/43

Primary Examiner—Daniel P. Stodola
Attorney, Agent, or Firm—Robert H. Montgomery

[57] ABSTRACT

A cone clutch comprising a housing member defining an internal frustro-conical surface, an internal member having an mating frustro-conical exterior surface received within the housing member, the housing member and the internal member being relatively rotatable, a layer of friction material is disposed between the frustro-conical surfaces and is unbonded to either surface, and means are provided for biasing the internal member into engagement with the frustro-conical surface of the housing member.

9 Claims, 2 Drawing Sheets

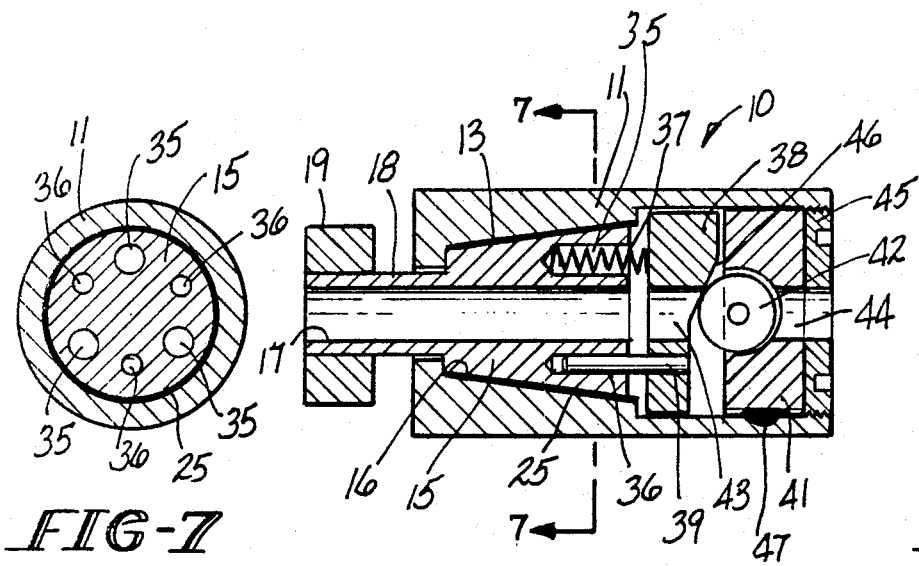
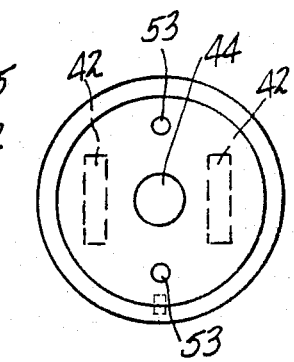
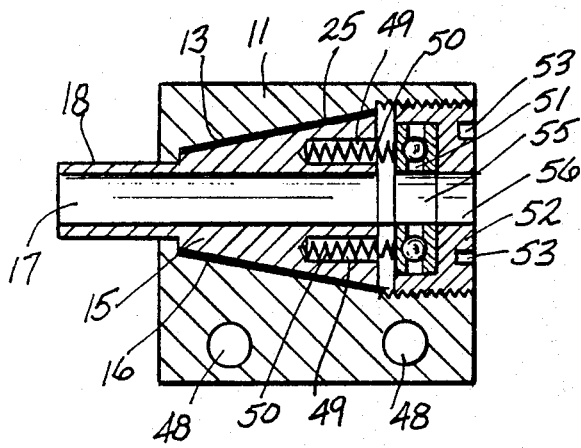
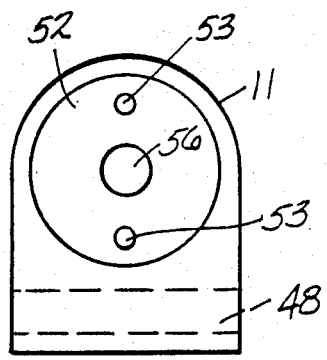
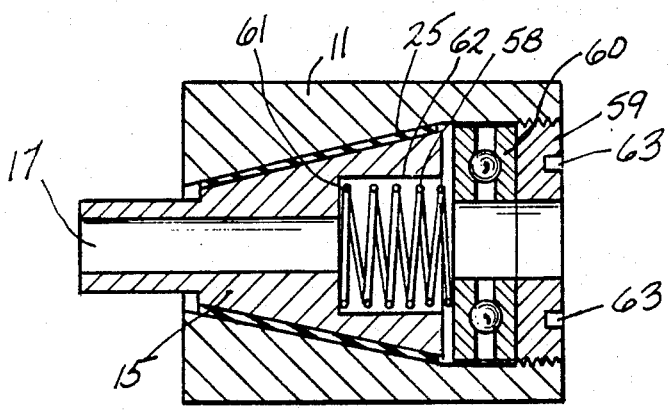

CONE CLUTCH

FIELD OF THE INVENTION

This invention relates to clutches and, more particularly, relates to what is known as cone clutches.

BACKGROUND OF THE INVENTION

Cone clutches are well known in which there is an outer member defining an inner frustro-conical surface and an inner member also defining an outer mating frustro-conical surface. However, most cone clutches as known in the prior art mount the inner member on a shaft. This presents problems of concentricity in that the shaft through the inner member may not be concentric with the inner member, which leads to eccentricity of the engaging surfaces for frictional or braking purposes, and therefore, variation of torque as one member rotates with respect to the other. Additionally, the shaft upon which the inner member is mounted must then be mounted in bearings or in rotatable sockets, which further compounds the problem of providing concentricity and constant torque.

This problem has been addressed in U.S. Pat. No. 2,308,966 which states that it eliminates the problem of the necessity for finished metal to metal bearings. However, this patent requires a rubber friction bushing to be bonded to the inner member and an outer friction sleeve which is integrally bonded thereto. However, differences in the thickness of the bonding agents can lead to variations in torque between the frictional surfaces as one member rotates relative to the other.

Accordingly, the present invention provides a new and improved cone clutch assembly in which reliance for concentricity is not made on a central shaft mounted in external bearings, and further, where there is no bonding of a frictional material to the mating surfaces of the clutch members.

SUMMARY OF THE INVENTION

Clutches embodying the invention are intended for applications where small physical dimensions are required, and where there are very small tolerances on the torque between the clutching or braking members. Briefly stated, the invention, in one form thereof, comprises an outer member, sometimes referred to as a housing member, having a frustro-conical interior surface, and an internal member having a mating frustro-conical exnternal surface, which are separated by a very small dimension. The mating surfaces are machined to close tolerances and disposed therebetween is a friction material which may be nylon, asbestos, or cork, depending upon the application. While nylon is not normally considered to be a friction material, it may be utilized between surfaces of a clutch to provide or define a given torque, as may any other material. In any event, the friction material between the mating frustro-conical surfaces is defined to a shape which will mate with the mating frustro-conical surfaces, but is not bonded to either surface. The frictional material, which may be on the order of a few thousandths of an inch, is defined in a shape which will mate with the frustro-conical surfaces and essentially completely surround such surfaces. There may be a slight dimension between the edges thereof, as will hereinafter be explained.

The inner member is fitted to the housing member without being mounted on a central shaft to avoid any problems in concentricity. This is the only journaling between the inner and outer members. However, in some cases, a central shaft may be passed through the inner member, but is not provided for purposes of supporting the inner member, but merely as a torque transfer member, in which case, it is keyed or otherwise affixed to the inner member for rotation therewith. One or more springs may be provided between the inner member and the outer member to adjust the torque therebetween. In some embodiments, the spring may act against a thrust bearing or a thrust plate. The springs may be received in either the inner member or the outer member.

In another embodiment, a cam or cams may be provided to act on followers carried by a closure member which is fixed with respect to the outer member, so as to provide variable torque in applications that so require.

An object of this invention is to provide a new and improved cone clutch.

A further object of this invention is to provide a new and improved cone clutch that does not require a central shaft journaled in external bearings.

Still a further object of this invention is to provide a cone clutch in which the friction material need not be bonded to either of the clutching or braking members.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

BRIEF DESCRIPTION OF THE DRAWINGS

FIG. 6 is a half-section view of still another embodiment of the invention showing a camming member which may be utilized to provide variable torque;

FIG. 7 is a view seen in the plane of lines 7—7 of FIG. 6;

FIG. 8 is an end view of the embodiment of FIG. 6 seen from the right;

FIG. 9 is a view in half-section of still another embodiment of the invention illustrating how variable or adjustable torque may be embodied into a construction embodying the invention;

FIG. 10 is an end view of the embodiment of FIG. 9 seen from the right side thereof; and FIG. 11 is a half-section of still another embodiment of the invention.

DETAILED DESCRIPTIONS OF PREFERRED EMBODIMENTS OF THE INVENTION

Figures 1, 2:
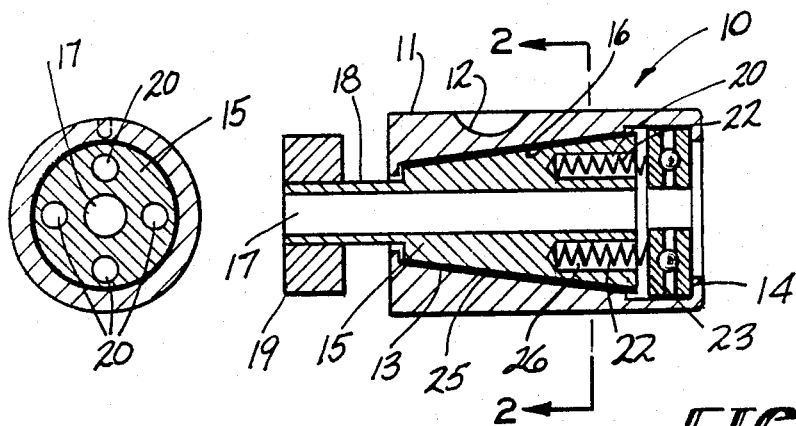
FIG. 1 is a half-section through a cone clutch embodying the invention.
FIG. 2 is a view seen in the planes of lines 2—2 of FIG. 1 without the springs of FIG. 1 therein.

Referring now to the drawings and particularly FIGS. 1 and 2, a first cone clutch 10 embodying the invention comprises an outer housing member 11 in which the outer housing member 11 is adapted to be made stationary as by means of a key slot 12. The housing member 11 has an interior continuous frustro-conical surface 13 and, as shown, has rolled over ends 14 for containment purposes, hereinafter described. An inner member 15 has an outer mating continuous frustro-conical surface 16 and defines a through passage 17. Member 15 has an extension 18 which receives thereon an adapter member 19 which is arranged to be coupled to an exterior member.

Figure 3:
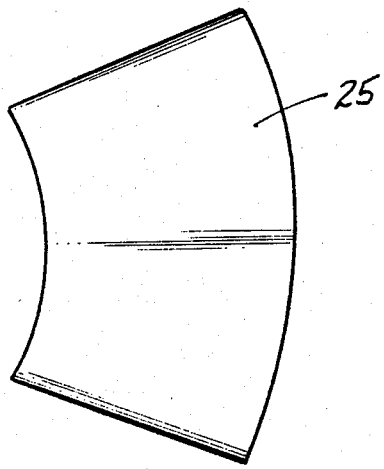
FIG. 3 is a plan view of a section of friction material which is utilized in the clutch of FIG. 1 and other clutches embodying the invention.

Reference is now made to FIG. 2 in conjunction with FIG. 1. Member 15 has defined therein a plurality of pockets 20 about the central passage 17, each of which is arranged to receive a helical spring 22. The helical springs 22 compressively bear on an annular thrust bearing 23, which is captured by end portions 14. The thrust bearing 23 together with the rolled over edges 14 define an end closure means at the larger diameter. The compression of springs 22 will determine the torque between the members 15 and 11. A friction material 25 is disposed between the mating surfaces of members 11 and 15. Such frictional material 25 is exemplified in FIG. 3 and comprises material to be cut in a form to fit between the mating surfaces 16 and 13. This material is wrapped around a mandrel and inserted into the bore defining surface 13 prior to the insertion of inner member 15. The material 25 is so cut with respect to the mating surfaces that its edges are in abutment, or just very slightly out of abutment, and the friction material 25 is not adhered to either of the mating surfaces 13 or 16. Thus, no adhesive is required which might settle in a layer of uneven thickness. In the alternative, the friction material may be molded or otherwise formed in a frustro-conical form and be received between the frustro-conical surfaces of members 11 and 15.

In assembly, after the inner member 15 is inserted after the frictional material, the springs 22 are inserted into the spring pockets 20. Then the annular thrust bearing 23 is inserted and the ends 14 are rolled over. In this construction, the torque between the outer member 11 and the inner member 15 will be substantially constant. There is no external factor such as thickness of a bonding agent, or lack of concentricity of an internal shaft which will detract from concentricity of the internal and the external member. Moreover, the passage 17 is so defined that wires or other elements may be passed between through the internal member 15.

After this assembly, the adapter member 19 which, in essence, is a connector member, may be connected to an external drive.

As shown, the external housing 11 has a key way 12 therein, which may be received in a device with a key (not shown) to render member 11 stationary.

Figure 4:
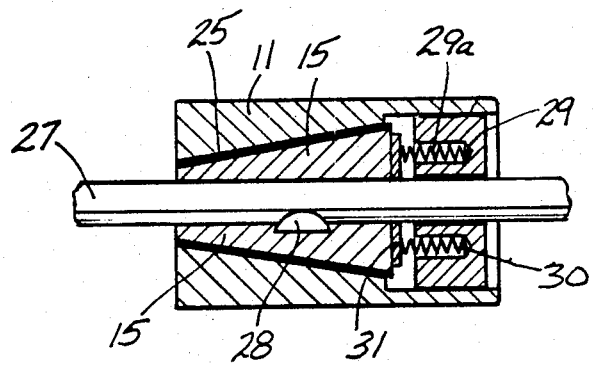
FIG. 4 is a half-section of another embodiment of the invention.
Figure 5:
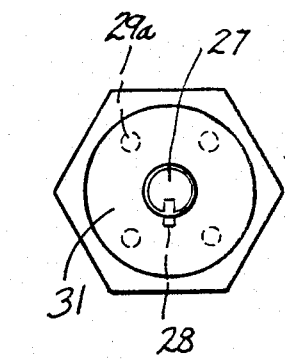
FIG. 5 is an end view of the embodiment of FIG. 4.

FIGS. 4 and 5 exemplify another embodiment of the invention where the same reference numerals are utilized with respect to the housing and the interior member, and the mating surfaces, and frictional material thereof.

Here, a shaft 27 extends through the inner member 15 and has a slot therein which is attached to member 15 by means of a key 28. However, it is to be understood that the member 15 does not depend for its concentricity with member 11 because of shaft 27. The member 15 is merely a drive member for shaft 27. Also, the outer housing member 11 is shown as hexagonal. Here, the tensioning is provided by a an end closure member in the form of a spring block 29 having sockets 29a receiving springs 30 biasing member 15 into engagement with member 11 through a thrust plate 31. Spring block 29 is retained in place and spring pressure is calibrated by the position of spring block 29 which is pressed into member 11.

Reference is now made to FIGS. 6, 7, and 8 which show a different embodiment of the invention. As shown in FIG. 6, a device embodying the invention comprises a housing member 11 which has an internal frustro-conical surface 13. An inner cooperating clutch member 15 has outer mating frustro-conical surface 16 and defines a through passage 17. Member 15 again has an extension 18 which receives thereon adapter member 19 which is arranged to be coupled to an exterior member. The friction material 25 is disposed between the mating frustro-conical surfaces 16 and 13.

Defined in inner member 15 are a plurality of spring sockets sockets 35 and pin sockets 36. The spring sockets receive springs 37, which bear on a camming member 38, while the pin sockets 36 receive pins 39, also extending in the camming member 38 to prevent rotation of camming member 38 with respect to inner member 15.

A member 41 carries a pair of cam followers 42 on either side of a central bores 43 and 44 extending through camming member 38, member 41, and a closure member 45 pressed or screwed into member 11. The bores 43 and 44 are co-extensive with bore 17.

The camming member 38 has an inclined surface 46 surrounding bore 43, which acting upon cam followers 42, provides a designed variable torque between members 11 and 15. It will be noted that as member 15 is rotated in relation to member 11, the action of the cam followers 42 on camming surface 46 will compress springs 37 and increase the torque between members 11 and 15. Member 41 is keyed to member 11, as indicated by the reference numeral 47, to prevent rotation thereof. It will be appreciated that the camming surface could be defined on the end of inner member 11 or a surface facing member 11 with the followers carried as member 11. In the first alternative, the followers would be on a member pinned to end plate 41 and biased therefrom.

FIGS. 9 and 10 exemplify still another embodiment of the invention which includes a housing member 11, an internal member 15 and a frictional material 25 therebetween. The housing member 11 has the internal frustro-conical surface 13 while the internal member 15 has the outer frustro-conical surface 16. In this embodiment, housing member 11 has defined therethrough passages 48 to provide a means for mounting housing member to another member (not shown).

In FIG. 9, the internal member 15 also has the extension 18. However, for simplicity of illustration, the adapter 19 is not shown. The internal member 15 has a plurality of sockets 49 defined therein which receive biasing springs 50 which bear on an annular thrust bearing 51 which is seated in a screwed in end plug 52. The end plug 52 has holes 53, as does a closure means in the form of an end plate 45 of FIGS. 6–8 to permit entrance of a wrenching member and screwing of the end plates therein in order to adjust torque to desired lever.

Thrust bearing 51 defines a central passage 55 therethrough and end plug 52 also defines a central passage 56 therethrough which are continuous with passage 17.

FIG. 11 illustrates another embodiment of the invention where only a single biasing spring 58 is of larger diameter than passage 17. A screwed in closure plate 59 acting on a thrust bearing 60 determines the compression on spring 58 which seats on the wall 61 of a bore 62 defined in member 15. Wrench holes 63 are provided in closure plate 59.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A cone clutch comprising a housing member defining an internal frustro-conical continuous surface and having openings at either end thereof, an internal member having a mating frustro-conical continuous exterior surface received within said housing member, said housing member and said internal member being relatively rotatable, a layer of friction material disposed between said frustro-conical surfaces and being unbonded to either surface, and means biasing said internal member into engagement with said frustro-conical surface of said housing member, an extension portion on said internal member extending without said housing member, said internal member having a central passage longitudinally therethrough, said extension portion having a passage therethrough aligned with said passage in said internal member, and closure means in said housing member at the larger diameter end of said frustro-conical internal surface, said biasing means acting between said interior member and said end closure means, said closure means having a passage therethrough axially aligned with said passage in said internal member and said extension portion whereby a through passage is defined through said clutch, said mating continuous frustro-conical surfaces providing the only journaling between said housing member and said internal member.

2. The cone clutch of claim 1 where one of said internal member and said closure means has a plurality of spring sockets defined therein, said biasing means comprising helical springs in said pockets, a thrust member on the other of said internal member and said closure means, said springs acting between said thrust member and said sockets.

3. The cone clutch of claim 1 further including a camming member rotatable with said internal member, said biasing means acting between said internal member and said camming member, a cam follower in said housing acting on a camming surface of said camming member whereby upon rotation of said internal member in relation to said housing member, the torque therebetween will vary in accordance with said camming surface.

4. The cone clutch of claim 1 where said internal member has an extension thereon extending without said housing member.

5. The cone clutch of claim 1 wherein said closure means is an end cap threaded to said housing member and is effective to vary the force of said biasing means acting on said internal member.

6. The cone clutch of claim 1 wherein said closure member comprises an annular thrust bearing and rolled over edges of said housing member.

7. The cone clutch of claim 1 where one of said internal member and said closure means has a plurality of spring sockets defined therein, said biasing means comprising springs in said sockets bearing on the other of said internal member and said closure means.

8. The clutch of claim 1 wherein said extension portion is integral with said internal member.

9. The clutch of claim 1 further including an adaptor member on said extension portion adapted to be coupled to an exterior member.

* * * * *